(12) United States Patent  
Mallett

(10) Patent No.: US 10,119,082 B2  
(45) Date of Patent: Nov. 6, 2018

(54) HYDROCRACKING PROCESS UTILIZING AQUEOUS AMMONIA

(71) Applicant: UOP LLC, Des Plaines, IL (US)

(72) Inventor: Vernon L. Mallett, Schaumburg, IL (US)

(73) Assignee: UOP LLC, Des Plaines, IL (US)

( * ) Notice: Subject to any disclaimer, the term of this patent is extended or adjusted under 35 U.S.C. 154(b) by 999 days.

(21) Appl. No.: 14/568,854

(22) Filed: Dec. 12, 2014

(65) Prior Publication Data

US 2016/0168487 A1 Jun. 16, 2016

(51) Int. Cl.
| | |
|---|---|
| *C10G 47/36* | (2006.01) |
| *C10G 47/12* | (2006.01) |
| *B01J 8/04* | (2006.01) |
| *C10G 47/16* | (2006.01) |

(52) U.S. Cl.  
CPC ............ *C10G 47/36* (2013.01); *B01J 8/0453* (2013.01); *C10G 47/12* (2013.01); *C10G 47/16* (2013.01); *C10G 2300/70* (2013.01)

(58) Field of Classification Search  
CPC .... B01J 8/0453; C10G 2300/70; C10G 47/00; C10G 47/02; C10G 47/12; C10G 47/16; C10G 47/36  
See application file for complete search history.

(56) References Cited

U.S. PATENT DOCUMENTS 5,888,377 A 3/1999 Bertram

*Primary Examiner* — Renee Robinson  
*Assistant Examiner* — Derek N Mueller

(57) ABSTRACT

A process for controlling hydrocracking reactions in a hydrocracking reactor by passing aqueous ammonia to the hydrocracking reactor. The aqueous ammonia is injected into the process at various locations at a low pressure, typically between approximately 0.17 to approximately 2.07 MPa (25 to 300 psi). A wash fluid can be used to lower the concentration of ammonia in the hydrocracking reactor, and thus, increase the catalytic activity of the hydrocracking catalyst.

18 Claims, 1 Drawing Sheet

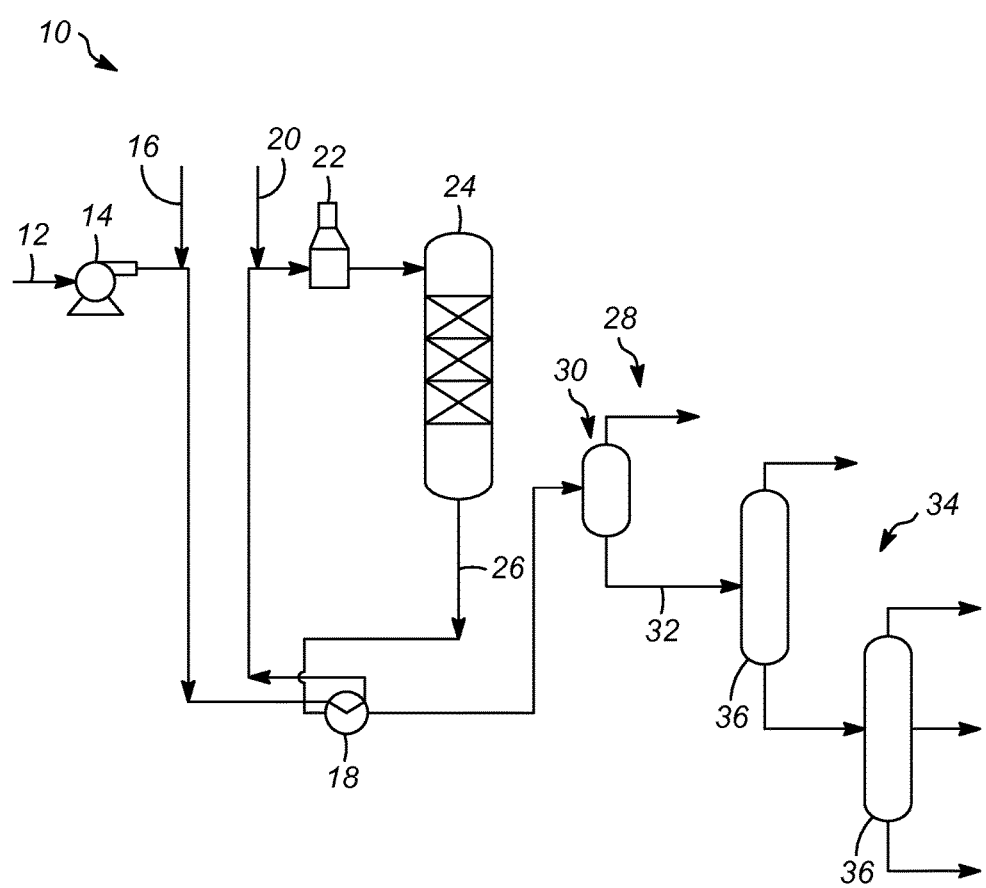

HYDROCRACKING PROCESS UTILIZING AQUEOUS AMMONIA

FIELD OF THE INVENTION

The invention relates to controlling a petroleum refining process used to perform catalytic hydrocracking and more specifically to controlling a process for a hydrocracking reaction zone containing highly active fresh or newly regenerated zeolitic catalyst.

BACKGROUND OF THE INVENTION

The vast economic importance of the hydrocracking process in modern petroleum refineries has resulted in significant development work aimed at improving the performance of hydrocracking process units. This development has resulted in the development of high activity zeolitic catalysts for use in these units. This high activity gradually decreases during the operation of the process unit due to the accumulation of carbonaceous deposits on the catalyst and through other means of deactivation. The initial high activity of fresh catalyst or newly regenerated catalyst has been recognized as a cause of operational or performance problems. The art has therefore developed methods of reducing the initial activity of fresh or newly regenerated hydrocracking catalyst through the addition of selective catalyst inhibitors. Many of these inhibitors contain nitrogen with ammonia being a preferred form of the selective catalyst inhibitors.

Many processes ammoniate the high zeolite hydrocracking catalyst via a high pressure injection of anhydrous ammonia. Such an injection process involves designing a high pressure injection system including a metering pump, high pressure piping, and instrumentation. There are mechanical as well as safety issues associated with the maintenance of the high pressure metering pump. Additionally, there is also the probability of ammonia leakage at high pressure. Alternatively, a refiner may contract for the supply of bulk ammonia with a supplier and require supplier to provide the pumping equipment. However, this can present issues due to reliability of the pumping systems. Additionally, the safety of the handling and pumping at high pressure anhydrous ammonia would still exist.

Instead of anhydrous ammonia, it is also known to use aqueous ammonia by, for example, injecting the aqueous ammonia into the recycle vapor line associated with a hydrocracking reactor. While such a process will alleviate some of the safety and handling concerns associated with high pressure anhydrous ammonia, the aqueous ammonia is still being used in a high pressure system. This requires the high pressure piping and pumping previously mentioned and includes the safety concerns discussed above.

It would be desirable to have a process that provides the safety benefits of the aqueous ammonia without using a high pressure injection system and equipment.

SUMMARY OF THE INVENTION

One or more processes have been invented in which a low pressure aqueous ammonia is injected into the hydrocracking reaction zone.

Therefore, in a first aspect of the present invention, the present invention may be broadly characterized as a process for controlling an activity of a hydrocracking catalyst in a hydrocracking reaction zone by injecting an aqueous ammonia stream into a hydrocracking reaction zone having a reactor with an acidic hydrocracking catalyst. A pressure of the aqueous ammonia stream when injected is between approximately 0.17 to approximately 2.07 MPa (25 to 300 psi).

In at least one embodiment, the aqueous ammonia stream is mixed with a feed stream to form a combined stream, wherein the combined stream is passed into the reactor.

In one or more embodiments, a pressure of the aqueous ammonia stream is between approximately 0.34 to approximately 1.7 MPa (50 to 250 psi).

In various embodiments, the aqueous ammonia stream comprises between 15 to 25 wt % of ammonia.

In some embodiments, the process includes passing a feed stream into the hydrocracking reaction zone and operating the reactor under hydrocracking conditions.

In at least one embodiment, the process includes reducing a concentration of ammonia from the acidic hydrocracking catalyst in the hydrocracking reaction zone with a wash fluid. It is contemplated that the process also includes monitoring for ammonia in an effluent from the reactor and reducing an amount of the ammonia passed to the hydrocracking reaction zone upon a detection of a predetermined level of ammonia in the effluent. It is further contemplated that the process includes increasing a temperature in the hydrocracking reaction zone after the amount of ammonia passed to the hydrocracking reaction zone is reduced. The wash fluid may comprise water.

In a second aspect of the present invention, the present invention may be broadly characterized as a process for maintaining a temperature of a hydrocracking reaction zone by hydrocracking hydrocarbons in the presence of hydrogen and an acidic hydrocracking catalyst in a reactor and inhibiting the hydrocracking by inhibiting acid sites on the acidic hydrocracking catalyst with ammonia. The ammonia is an aqueous ammonia having an initial pressure of between approximately 0.17 to approximately 2.07 MPa (25 to 300 psi).

In some embodiments, the process further comprises passing a stream of the aqueous ammonia to the hydrocracking reaction zone. It is contemplated that the initial pressure of the aqueous ammonia is between approximately 0.34 to approximately 1.7 MPa (50 to 250 psi).

In at least one embodiment, the process further comprises mixing a feed stream with the aqueous ammonia to form a combined stream and passing the combined stream to the reactor.

In various embodiments, the catalyst comprises a fresh catalyst.

In one or more embodiments, the process further comprises reducing a concentration of ammonia in the hydrocracking reaction zone with a wash fluid. It is contemplated that the wash fluid is water.

It is contemplated that the process also includes increasing the hydrocracking catalytic activity in the hydrocracking reaction zone by reducing an ammonia concentration in the hydrocracking reaction zone.

In a third aspect of the present invention, the present invention may be broadly characterized as a process for hydrocracking hydrocarbons by: hydrocracking a portion of hydrocarbons in a feed stream in the presence of hydrogen and an acidic hydrocracking catalyst in a reactor; passing a stream of aqueous ammonia having an initial pressure between approximately 0.17 to approximately 2.07 MPa (25 to 300 psi) to the hydrocracking reaction zone; and, decreasing an amount of aqueous ammonia passed to the reactor to increase the hydrocracking reactions.

In some embodiments, the process further comprises mixing the aqueous ammonia with the feed stream upstream of the reactor.

In at least one embodiment, the process further comprises vaporizing the aqueous ammonia within the reactor.

Additional objects, embodiments, and details of the invention are set forth in the following detailed description of the invention.

DETAILED DESCRIPTION OF THE DRAWINGS

In the drawing of the present invention, one or more embodiments are shown in which like numerals denote like elements and, in which:

the FIGURE shows a process flow diagram according to one or more embodiments of the present invention.

DETAILED DESCRIPTION OF THE INVENTION

Hydrocracking process units are used commercially in large petroleum refineries around the world. These catalytic conversion units process a variety of feeds ranging from naphthas to very heavy residual fractions of crude oil. In general, the hydrocracking process splits the molecules of the feedstream into smaller molecules having a higher average volatility and normally higher economic value. Much work has been devoted to the development of catalysts which are very selective in converting the feed into the desired boiling range products rather than overconverting to lower value molecules. The hydrocracking process also normally improves the quality of the feed material being processed by providing products of higher hydrogen to carbon ratio and by removing sulfur and nitrogen from the feed materials. The sulfur and nitrogen are normally converted to hydrogen sulfide and ammonia which are then removed from the process. The significant economic utility of the hydrocracking process has resulted in a large developmental effort being devoted to the improvement of the process and to the development of better catalysts for use in the process.

The present invention is directed to a process for moderating the acidity of a catalyst used in hydrocracking. It is believed the subject invention functions because the ammonia molecule becomes attached to an acid site in the catalyst. The acid site of the catalyst is needed for the hydrocracking reaction. The presence of the ammonia molecule results in the acid site not being available for the cracking reaction and, thus, the activity of the catalyst is reduced by the ammonia. The catalyst may comprise, for example, Y zeolitic catalysts or Beta zeolite catalysts. Many synthetic materials such as ZSM-5 molecular sieves, borosilicate molecular sieves, nonzeolitic molecular sieves and pillared materials, which contain acid sites and can be employed as components of hydrocracking catalysts. It is contemplated that the present invention can be employed to moderate the acidity of hydrocracking catalysts in general including hydrocracking catalysts containing any of these several different acidic materials. The present invention is therefore not believed limited to application with hydrocracking catalysts comprising a Y zeolite.

When a hydrocracking process unit has been loaded with fresh catalyst (either unused catalyst or catalyst that has been regenerated) the activity of the various catalyst components is much greater than after the process unit has been on stream for some time. The result is that the catalyst will begin to promote the hydrocracking reactions at a relatively low temperature. The hydrocracking reactions are exothermic, and the released heat of the reactions occurring near the inlet of the reactor heats the reactants. As these heated reactants travel through the catalyst bed they contact downstream catalyst and heat this catalyst. This in turn increases the activity of the downstream catalyst. The result is an increase in downstream catalyst activity which can reach the state of an uncontrolled high temperature "runaway." This causes significant over conversion of the feed to lower value products. If uncontrolled, the temperature increase can result in damage to the catalyst or in extreme cases damage to the reactor and reactor internal structures.

The desired "distillate" products of a hydrocracking process may be recovered as a bottom or sidecut of a product fractionation column and include the naphtha, kerosene and diesel fractions. The term "conversion" as used herein refers to the chemical change necessary to convert the feed molecules into product hydrocarbons which are removed in one of the distillate product streams withdrawn from the process. Hydrocarbons removed from the bottom of the product recovery column as a drag stream may be a high value product and, depending on the configuration of the unit, may not be considered to be either distillates or conversion products for purposes of this definition of conversion. The product distribution of the subject process is set by the feed composition and the selectivity of the catalyst(s) at the conversion rate obtained in the reaction zones at the chosen operating conditions. The subject process is especially useful in the production of middle distillate fractions boiling in the range of about 149 to 371° C. 300 to 700° F. (300 to 700° F.) as determined by the appropriate ASTM test procedure. The term "middle distillate" is intended to include the diesel, jet fuel, and kerosene boiling range fractions. The terms "kerosene" and "jet fuel boiling point range" are intended to refer to about 149 to 288° C. (300 to 550° F.) and diesel boiling range is intended to refer to hydrocarbon boiling points of about 170 to about 371° C. (338 to 700° F.). The gasoline or naphtha fraction is normally considered to be the $C_5$ hydrocarbons to 204° C. (400° F.) endpoint fraction of available hydrocarbons. The boiling point ranges of the various product fractions recovered in any particular refinery will vary with such factors as the characteristics of the crude oil source, the refinery's local markets, product prices, etc. Reference is made to ASTM standards D-975 and D-3699-83 for further details on kerosene and diesel fuel properties and to D-1655 for aviation turbine feed. These definitions provide for the inherent variation in feeds and desired products which exists between different refineries. Typically, this definition will require the production of distillate hydrocarbons having boiling points below about 371° C. (700° F.).

The reaction zone should be designed and operated to achieve at least a 40 volume or weight percent conversion of feed compounds boiling above the maximum desired product boiling point. Preferably, the conversion level in a once-through process is above 60 volume or weight percent and more preferably the conversion level is above 70 volume or weight percent. The conversion level in the once-through reaction zone is typically lower than in a recycle reaction zone processing the same feed. The total conversion level in a recycle process, processing a light feed, is most preferably above 90 volume percent and is preferably above 95 volume or weight percent. Additionally, in some configurations and embodiments, the reaction zone achieves between 15 to 20 volume or weight percent conversion.

As shown in the FIGURE, in a representative example of a conventional hydrocracking reaction zone 10, a feed stream 12, for example, a heavy gas oil, is charged in a charge pump 14 to the process and admixed with a hydrocarbon recycle stream 16 (discussed below). The resultant admixture of these two liquid phase streams is heated in an indirect heat exchanger 18 and then combined with a hydrogen-rich gas stream 20. The admixture of charge hydrocarbons, recycle hydrocarbons and hydrogen is heated in a fired heater 22 and thereby brought up to the desired inlet temperature for a reactor 24 or vessel. Within the reactor 24 the mixture of hydrocarbons and hydrogen are brought into contact with one or more beds of a solid hydrocracking catalyst maintained at hydrocracking conditions. This contacting results in the conversion of a significant portion of the entering hydrocarbons into molecules of lower molecular weight and therefore of lower boiling point.

There is thereby produced a reaction zone effluent stream 26 which comprises an admixture of the remaining hydrogen which is not consumed in the reaction, light hydrocarbons such as methane, ethane, propane, butane, and pentane formed by the cracking of the feed hydrocarbons, and other reaction by-products such as hydrogen sulfide and ammonia formed by hydrodesulfurization and hydro-denitrification reactions which occur simultaneously with the hydrocracking reaction. The reaction zone effluent 26 will also contain the desired product hydrocarbons boiling in the gasoline, diesel fuel, kerosene and/or fuel oil boiling point ranges and some unconverted feed hydrocarbons boiling above the boiling point ranges of the desired products. The effluent 26 of the hydrocracking reaction zone will therefore comprise an extremely broad and varied mixture of individual compounds.

The hydrocracking reaction zone effluent 26 is typically removed from contact with the catalyst bed, heat exchanged with the feed 12 to the reactor 24 in heat exchanger 18 for heat recovery and then passed into a vapor-liquid separation zone 28 normally including at least one high pressure separator 30. Additional cooling can be done prior to this separation. In some instances a hot flash separator is used downstream of the high pressure separator. The use of "cold" separators to remove condensate from vapor removed from a hot separator is another option. The liquids 32 recovered in these vapor-liquid separation zone 28 are passed into a product recovery zone 34 containing one or more fractionation columns 36. Product recovery methods for hydrocracking are well known and conventional methods may be employed in the subject invention. In many instances the conversion achieved in the hydrocracking reactor(s) is not complete and some heavy hydrocarbons are removed from the product recovery zone as a "drag stream," and/or as the hydrocarbon recycle stream 16. The recycle stream is preferably passed into the reactor 24, if the overall process includes a hydrotreating reactor, as this reduces the capital cost of the overall unit. It may, however, be passed directly into the hydrocracking reactor 24. A net drag stream may be removed from the hydrocracking process. This allows the use of less severe conditions in the reaction zone(s). The size of the drag stream can be in the broad range of 1 to 20 volume percent of the process feed stream, but is preferably in the range of 2 to 10 volume percent.

In some hydrocracking processes two or more hydrocracking reactors are used in series. Plural hydrocracking reactors can be employed in a single-stage flow in which all of the reactants flow in sequence through both reactors. They can also be employed in what is termed a two-stage flow in which some separation occurs between the stages. This separation can range from a simple flashing operation to remove gases including hydrogen sulfide and ammonia to a full fractional distillation which recovers intermediate products. Unconverted recycle hydrocarbons may be charged to either the first or second stage. The hydrotreating which may occur in the first stage of a two-stage hydrocracking unit, plus any upstream hydrotreating, results in the feed to the second stage of a two-stage hydrocracking unit having a very low concentration of hydrogen sulfide and ammonia. These gases tend to moderate the activity of modem zeolitic catalysts. Their absence in the feed and recycle gas to the second stage results in the catalyst having a much higher initial activity and heightens the risk of a temperature "runaway" caused by an uncontrolled reaction rate.

The present invention is based, in part, upon the recognition of the benefits and advantages obtained by using aqueous ammonia in a startup procedure compared to the prior art use of anhydrous ammonia. Many of the prior art designs requires handling high pressure liquids and/or gases, with the gases themselves being toxic and dangerous. It is much easier to handle aqueous ammonia, which can be transported and stored at moderate pressures. The release of the same amount of aqueous ammonia does not cause as large of an environmental problem, and aqueous ammonia does not release ammonia into the atmosphere at the same rate as the same volume of liquefied ammonia. A leak of aqueous ammonia is therefore not as likely to cause formation of an ammonia cloud as an equivalent leak of anhydrous ammonia.

In addition to the use of aqueous ammonia, the present invention is also based, in part, upon the use of low pressure injection into the reactor zone on a continuous basis for the purposes of attenuating zeolite catalyst to shift selectivity toward a heavier product slate and reduced light ends generation. By low pressure it is meant that the aqueous ammonia has a pressure between about 0.17 to approximately 2.07 MPa (25 to 300 psi), preferably between approximately 0.34 to approximately 1.7 MPa (50 to 250 psi) when injected. The aqueous ammonia will be vaporized upon passing into the reactor. The aqueous ammonia is injected into the hydrocracking reaction zone to increase the ammonia concentration in the reaction zone to suppress the tendency of the hydrocracking catalyst to perform cracking at an undesirable rate. Preferably, the aqueous ammonia comprises 15 to 25 wt % of ammonia.

There are different locations within the hydrocracking reaction zone where the aqueous ammonia may be injected. For example, the aqueous ammonia could be injected into the suction of the charge pumps 14 in the reaction zone. Alternatively, the aqueous ammonia could be injected in its own line into the reactor 24. It is also contemplated that the aqueous ammonia could be injected into an inlet of the charge heater 22 or injected into a line carrying a heated feed stream downstream of the charge heater.

During start-up, the injection may be done after the catalyst has been warmed somewhat by the circulation of hydrogen-rich gas or liquid feed, before the feed stream is charged to the reactor. Additionally, the injection may also be done after the feed stream is heated in the charge heater and before increasing reactor catalyst temperatures above 204° to 232° C. (400° to 450° F.). Preferably the inlet temperature of the catalyst bed is at least 204° to 232° C. (400° to 450° F.) when the ammonia injection is started. Once the reactor has been operating for some period of time, which can vary greatly from a few hours to a few days depending on the type of liquid hydrocarbon feed being charged to the unit and specifically the amount of native nitrogen that is in the feed that will convert to ammonia, the ammonia injection rate may be slowly reduced to a maintenance level or the injection is totally discontinued.

The rate of ammonia injection may be quite high at the start of operations, and the ammonia concentration at the inlet to the reaction zone may reach 100 to 500 wppm, again depending on the native nitrogen in the feed which can convert to ammonia and which can vary from 5 to 25 wppm to higher. In contrast, an optional maintenance injection of ammonia after startup is intended to maintain the ammonia concentration in the reactor at a lower level. A maintenance level between 5 to 25 wppm may be suitable for some applications; however, it is to be understood that these amounts are merely exemplary and depending on the feed composition, the number of reactors, and catalyst type, a level between 5 to 1000 wppm may be utilized. The maintenance mode comprises injecting aqueous ammonia at a rate sufficient to ensure any variation in ammonia concentration due to changes in operation is overwhelmed by the total ammonia concentration. This is a continuous injection which extends past the initial start-up steps.

The customary procedure of injecting water into the effluent of the reaction zone as a wash fluid to dissolve salts which would otherwise form from the ammonium and hydrogen sulfide upon the cooling of the reaction zone may be utilized in the various process of the present invention. This wash fluid injection normally results in the removal of a very large percentage of the ammonia from the reaction zone effluent since a large volume of water will normally be necessary to wash out the excess of hydrogen sulfide.

Additionally, water may be used as a wash fluid, typically in a recycle gas loop, to reduce the concentration of ammonia, so as to increase the catalytic activity of the hydrocracking reaction zone. The effluent may be monitored for the presence of ammonia during a wash, and the amount of aqueous ammonia injected or passed to the hydrocracking reaction zone may be reduced upon a detection of ammonia, or upon a detection of certain amount of ammonia. After reducing the amount of ammonia, the catalyst will be less inhibited and the reactor temperature will increase.

The subject invention can be employed in both single-stage and two-stage hydrocracking units. While each stage will comprise at least one reactor, a "stage" in a hydrocracking unit is not synonymous with a reactor and a stage may contain two or three reactors. In addition, a single reactor may contain two or more types of catalyst such as hydrotreating and hydrocracking catalyst. The defining characteristic of a two-stage unit is the presence of a vapor-liquid separation between the stages plus some means of reducing the carryover of ammonia and hydrogen sulfide from the first stage to the second stage. The injection of water sufficient to allow collection of a separate water phase recovered from the first stage effluent is one such means of removing these reaction by-products as the water will contain ammonium sulfate salts from the absorption of ammonia and hydrogen sulfide. The effluent of the first stage may be de-pressured, for example by flashing into a vapor-liquid separator, or the effluent may be passed into a fractionation column which can strip out light ends or naphtha boiling range hydrocarbons. The latter procedures result in the production of a first-stage liquid effluent having a very low level of hydrogen sulfide and ammonia. If the hydrotreating performed in the first stage is effective and/or the feed to the first stage is low in nitrogen, the total nitrogen content of the first stage liquid product will also be low. This liquid hydrocarbon phase is the feed to the second stage.

Often the net gas recovered from the first-stage effluent is purified for the removal of hydrogen sulfide before being recycled. The total net gas may return to the first stage, but a portion of the treated gas could flow into the second stage. More commonly some of the second-stage net gas is allowed to pass into the first stage as makeup gas to the first stage, with the makeup hydrogen for the overall process being charged to the second stage. Unconverted hydrocarbons may also be recycled to the first stage.

The ammonia concentration in the reaction zone processing a feed having a higher nitrogen content will increase faster and reach a higher level. Thus, the catalyst in this reaction zone, typically the first stage, will suffer from a higher degree of acid site poisoning by ammonia than an equivalent catalyst in the subsequent stage. The catalyst in the first stage may contact a raw feed or a hydrotreated feed plus ammonia generated during hydrotreating and is therefore less likely to be susceptible to a temperature runaway than catalyst in the second stage.

Suitable feedstocks for the subject process include virtually any heavy hydrocarbonaceous mineral or synthetic oil or a mixture of one or more fractions thereof. Thus, such known feedstocks as straight run gas oils, vacuum gas oils, demetallized oils, deasphalted vacuum residue, coker distillates, cat cracker distillates, shale oil, tar sand oil, coal liquids and the like are contemplated. The preferred feedstock will have a boiling point range starting at a temperature above about 260° C. (500° F.) and does not contain an appreciable concentration of asphaltenes. The feed stream should have a boiling point range falling between 260° to 538° C. (500° to 1000° F.), with some feedstocks having at least 50 percent volume of their components boiling above 371° C. (700° F.). The hydrocracking feedstock may contain nitrogen, usually present as organic nitrogen compounds in amounts between 1 ppm and 1.0 wt %. The feed will normally also contain sulfur containing compounds sufficient to provide a sulfur content greater than 0.15 wt %. Notwithstanding the foregoing, the feedstocks can vary greatly in bulk properties such as distillation, API gravity, sulfur, nitrogen and contaminates and can have a boiling point range which has an end point greater than 600° C.

Hydrocracking conditions employed in the subject process are those customarily employed in the art for hydrocracking. Hydrocracking reaction temperatures are in the broad range of 204° to 454° C. (400° to 850° F.). Reaction pressures are preferably between about 13,780 to 24,130 kPa (1000 to 3000 psi). Contact times usually correspond to liquid hourly space velocities (LHSV) in the range of about 0.1 $hr^{-1}$ to 15 $hr^{-1}$, preferably between about 0.2 and 3 $hr^{-1}$.

Suitable catalysts comprises between 1 wt % and 90 wt % Y zeolite, preferably between 10 wt % and 80 wt %. The zeolitic catalyst composition should also comprise a porous refractory inorganic oxide support (matrix) which may form between about 10 and 99 wt %, and preferably between 20 and 90 wt % of the support of the finished catalyst composite. The matrix may comprise any known porous refractory inorganic oxide such as alumina, magnesia, silica, titania, zirconia, silica-alumina and the like and preferably comprises a combination thereof such as alumina and silica-alumina. The most preferred matrix comprises a mixture of silica-alumina and alumina wherein the silica-alumina comprises between 15 and 85 wt % of said matrix. It is also preferred that the support comprises from about 5 wt % to about 45 wt % alumina. The as synthesized zeolite may be modified by techniques known in the art which provide a desired form of the zeolite. Thus, modification techniques such as hydrothermal treatment at increased temperatures, calcination, washing with aqueous acidic solutions, ammonia exchange, impregnation, or reaction with an acidity strength inhibiting specie, and any known combination of these are contemplated. A Y-type zeolite preferred for use in the present invention possesses a unit cell size between about 24.20 Angstroms and 24.45 Angstroms. Preferably, the zeolite unit cell size will be in the range of about 24.20 to 24.40 Angstroms and most preferably about 24.30 to 24.38 Angstroms. The Y zeolite is preferably dealuminated and has a framework $SiO_2:Al_2O_3$ ratio greater than 6, most preferably between 6 and 25. It is contemplated that other zeolites, such as Beta, Omega, L or ZSM-5, could be employed as the zeolitic component of the hydrocracking catalyst in place of or in addition to the preferred Y zeolite.

The silica-alumina component of the hydrocracking or hydrotreating catalyst may be produced by any of the numerous techniques which are well described in the prior art relating thereto. Such techniques include the acid-treating of a natural clay or sand, coprecipitation or successive precipitation from hydrosols. These techniques are frequently coupled with one or more activating treatments including hot oil aging, steaming, drying, oxidizing, reducing, calcining, etc. The pore structure of the support or carrier commonly defined in terms of surface area pore diameter and pore volume, may be developed to specified limits by any suitable means including aging a hydrosol and/or hydrogel under controlled acidic or basic conditions at ambient or elevated temperature.

An alumina component of the catalysts may be any of the various hydrous aluminum oxides or alumina gels such as alpha-alumina monohydrate of the boehmite structure, alpha-alumina trihydrate of the gibbsite structure, beta-alumina trihydrate of the bayerite structure, and the like.

The finished catalysts for utilization in the subject process should have a surface area of about 200 to 700 square meters per gram, an average pore diameter of about 20 to about 300 Angstroms, a pore volume of about 0.10 to about 0.80 milliliters per gram, and apparent bulk density within the range of from about 0.50 to about 0.90 gram/cc. Surface areas may be between 190 to 250 $m^2/g$, with a surface area above 350 $m^2/g$ being preferred.

The composition and physical characteristics of the catalyst such as shape and surface area are not considered to be limiting upon the utilization of the present invention. The catalyst may, for example, exist in the form of pills, pellets, granules, broken fragments, spheres, or various special shapes such as trilobal extrudates, disposed as a fixed bed within a reaction zone. Alternatively, the hydrocracking catalyst may be prepared in a suitable form for use in moving bed reaction zones in which the hydrocarbon charge stock and catalyst are passed either in countercurrent flow or in co-current flow. Another alternative is the use of a fluidized or ebulated bed hydrocracking reactor in which the charge stock is passed upward through a turbulent bed of finely divided catalyst, or a suspension-type reaction zone, in which the catalyst is slurried in the charge stock and the resulting mixture is conveyed into the reaction zone. The charge stock may be passed through the reactor(s) in the liquid or mixed phase, and in either upward or downward flow. The catalyst particles may be prepared by any known method in the art including the well-known oil drop and extrusion methods.

A preferred form for the catalysts used in the subject process is an extrudate. The well-known extrusion method involves mixing the molecular sieve, either before or after adding metallic components, with the binder and a suitable peptizing agent to form a homogeneous dough or thick paste having the correct moisture content to allow for the formation of extrudates with acceptable integrity to withstand further handling and subsequent calcination. Extrudability is determined from an analysis of the moisture content of the dough, with a moisture content in the range of from 30 to 50 wt % being preferred. The dough then is extruded through a die pierced with multiple holes and the spaghetti-shaped extrudate is cut to form particles in accordance with techniques well known in the art. A multitude of different extrudate shapes are possible, including, but not limited to, cylinders, cloverleaf, dumbbell and symmetrical and asymmetrical polylobates. It is also within the scope of this invention that the uncalcined extrudates may be further shaped to any desired form, such as spheres, by any means known to the art.

A spherical catalyst may be formed by use of the oil dropping technique. As is known, this method involves dropping the mixture of molecular sieve, alumina sol, and gelling agent into an oil bath maintained at elevated temperatures. The droplets of the mixture remain in the oil bath until they set to form hydrogel spheres. The spheres are then continuously withdrawn from the initial oil bath and typically subjected to specific aging treatments in oil and an ammoniacal solution to further improve their physical characteristics. The resulting aged and gelled particles are then washed and dried at a relatively low temperature of about 50 to 200° C. (F) and subjected to a calcination procedure at a temperature of about 450 to 700° C. for a period of about 1 to about 20 hours. This treatment effects conversion of the hydrogel to the corresponding alumina matrix. The zeolite and silica-alumina must be admixed into the aluminum containing sol prior to the initial dropping step.

Hydrogenation components may be added to the catalysts before or during the forming of the catalyst particles, but the hydrogenation components of the hydrocracking catalyst are preferably composited with the formed support by impregnation after the zeolite and inorganic oxide support materials have been formed to the desired shape, dried and calcined. Impregnation of the metal hydrogenation component into the catalyst particles may be carried out in any manner known in the art including evaporative, dip and vacuum impregnation techniques. In general, the dried and calcined particles are contacted with one or more solutions which contain the desired hydrogenation components in dissolved form. After a suitable contact time, the composite particles are dried and calcined to produce finished catalyst particles. Hydrogenation components contemplated for use in the catalysts are those catalytically active components comprising a metal selected from the group consisting of nickel, molybdenum, tungsten, cobalt, platinum, palladium. The metal may be present as an oxide, sulfide or other compound. It is preferred that the catalyst comprise only one or two base metals or only one of the noble metals, such as platinum or palladium. The use of platinum or palladium is highly preferred.

By using the low pressure aqueous ammonia, the processes according to the present invention allow a low pressure system to be utilized. Thus, the drawbacks associated with the high pressure system, even with the aqueous ammonia, can be minimized.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understating the embodiments of the present invention.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A process for controlling an activity of a hydrocracking catalyst in a hydrocracking reaction zone, the process comprising:
    passing an aqueous ammonia stream into a hydrocracking reaction zone having an acidic hydrocracking catalyst, wherein a pressure of the aqueous ammonia stream when injected is between approximately 0.17 to approximately 2.07 MPa (25 to 300 psi) and reducing an ammonia concentration in the hydrocracking reaction zone with a wash fluid.

2. The process of claim 1, wherein the aqueous ammonia stream is mixed with a feed stream to form a combined stream, wherein the combined stream is passed into the hydrocracking reaction zone.

3. The process of claim 1 wherein a pressure of the aqueous ammonia stream is between approximately 0.34 to approximately 1.7 MPa (50 to 250 psi).

4. The process of claim 1 wherein the aqueous ammonia stream comprises between 15 to 25 wt % of ammonia.

5. The process of claim 1 further comprising:
    passing a feed stream into the hydrocracking reaction zone; and,
    operating the hydrocracking reaction zone under hydrocracking conditions.

6. The process of claim 1 further comprising:
    monitoring for ammonia in an effluent from the hydrocracking reaction zone; and,
    reducing an amount of the ammonia passed to the hydrocracking reaction zone upon a detection of ammonia in the effluent.

7. The process of claim 6 further comprising:
    increasing a temperature in the hydrocracking reaction zone after the amount of ammonia passed to the hydrocracking reaction zone is reduced.

8. The process of claim 7 wherein the wash fluid comprises water.

9. A process for maintaining a temperature of a hydrocracking reaction zone, the process comprising:
    hydrocracking hydrocarbons in the presence of hydrogen and an acidic hydrocracking catalyst in a hydrocracking reaction zone;
    inhibiting the hydrocracking of the hydrocracking reaction zone by inhibiting acid sites on the acidic hydrocracking catalyst with ammonia,
    wherein the ammonia is an aqueous ammonia having an initial pressure of between approximately 0.17 to approximately 2.07 MPa (25 to 300 psi); and
    reducing an ammonia concentration in the hydrocracking reaction zone with a wash fluid.

10. The process of claim 9 further comprising:
    passing a stream of the aqueous ammonia to the hydrocracking reaction zone.

11. The process of claim 10 wherein the initial pressure of the aqueous ammonia is between approximately 0.34 to approximately 1.7 MPa (50 to 250 psi).

12. The process of claim 9 further comprising:
    mixing a feed stream with the aqueous ammonia to form a combined stream; and,
    passing the combined stream to the hydrocracking reaction zone.

13. The process of claim 9 wherein the catalyst comprises a fresh catalyst.

14. The process of claim 9 wherein the wash fluid is water.

15. The process of claim 9 further comprising:
    increasing the hydrocracking catalytic activity in the hydrocracking reaction zone by reducing an ammonia concentration in the hydrocracking reaction zone.

16. A process for hydrocracking hydrocarbons, the process comprising: hydrocracking a portion of hydrocarbons in a feed stream in the presence of hydrogen and an acidic hydrocracking catalyst in a hydrocracking reaction zone; passing a stream of aqueous ammonia having an initial pressure between approximately 0.17 to approximately 2.07 MPa (25 to 300 psi) to the hydrocracking reaction zone; and decreasing an amount of aqueous ammonia passed to the hydrocracking reaction zone to increase the hydrocracking reactions by reducing an ammonia concentration to the hydrocracking reaction zone with a wash fluid.

17. The process of claim 16 further comprising:
    mixing the aqueous ammonia with the feed stream upstream of the hydrocracking reaction zone.

18. The process of claim 16 further comprising:
    vaporizing the aqueous ammonia within the hydrocracking reactor.

* * * * *